(12) United States Patent
Yamauchi et al.

(10) Patent No.: US 6,961,159 B2
(45) Date of Patent: Nov. 1, 2005

(54) HOLOGRAPHIC VIEWING DEVICE, AND COMPUTER-GENERATED HOLOGRAM FOR THE SAME

(75) Inventors: Tsuyoshi Yamauchi, Tokyo (JP); Mitsuru Kitamura, Tokyo (JP)

(73) Assignee: Dai Nippon Printing Co, Ltd., Tokyo (JP)

( * ) Notice: Subject to any disclaimer, the term of this patent is extended or adjusted under 35 U.S.C. 154(b) by 0 days.

(21) Appl. No.: 10/632,828

(22) Filed: Aug. 4, 2003

(65) Prior Publication Data

US 2004/0027626 A1 Feb. 12, 2004

(30) Foreign Application Priority Data

Aug. 2, 2002 (JP) .............................. 2002-225604

(51) Int. Cl.⁷ ............................................. G02C 11/02
(52) U.S. Cl. ............................ 359/3; 359/29; 359/13; 359/1; 359/32; 351/52
(58) Field of Search .............................. 359/3, 9, 13, 1, 359/2, 22, 25, 29, 32; 351/51, 52, 158

(56) References Cited

U.S. PATENT DOCUMENTS 5,546,198 A * 8/1996 van der Gracht et al. ...... 359/1

* cited by examiner

*Primary Examiner*—Fayez G. Assaf
(74) *Attorney, Agent, or Firm*—Sughrue Mion, PLLC (57) ABSTRACT

The invention relates to a holographic viewing device that enables a given pattern to be properly viewed in place of light sources in a scene and is easy to fabricate and assemble with consistent characteristics, and a computer-generated hologram for the same. The invention provides a holographic viewing device in which computer-generated holograms 2 and 3 each constructed as a transmission Fourier transform hologram is fitted in a frame member 1. At least one of phase information and amplitude information recorded in a certain predetermined peripheral site of the computer-generated hologram 2, 3 relative to an input pattern reconstructible from the computer-generated hologram is removed.

9 Claims, 7 Drawing Sheets

HOLOGRAPHIC VIEWING DEVICE, AND COMPUTER-GENERATED HOLOGRAM FOR THE SAME

BACKGROUND OF THE INVENTION

The present invention relates generally to a holographic viewing device and a computer-generated hologram for the same, and more particularly to holographic spectacles comprising a hologram mounted on a spectacle frame in such a proper direction as to easily make out the top and bottom and the two sides of the hologram, thereby providing a proper viewing of images in a given form, and a computer-generated hologram for the same.

U.S. Pat. No. 5,546,198 has proposed holographic spectacles constructed as shown in the perspective view of FIG. 8(a). As shown, two transmission type holograms 2 and 3 are fitted in the two-eye sections of a spectacle frame 1. When the spectacles are used to view a scene including such limited extent light sources 4, 5, 6 and 7 as shown in FIG. 8(b), the user would see it as if shown in FIG. 8(c) as an example. In other words, the user would see the pre-selected patterns "NOEL" 8, 9, 10 and 11 in place of the light sources 4, 5, 6 and 7 in the natural scene of FIG. 8(b). For the transmission holograms 2 and 3 having such characteristics, Fourier transform holograms (Fraunhofer holograms) of the aforesaid pattern "NOEL" designed as computer-generated holograms are used.

In a computer-aided Fourier transform hologram, a limited rectangular area including a pattern ("NOEL" as mentioned above) recorded in that hologram is divided into a matrix array of cells, so that information regarding a pattern portion corresponding to each cell site can be allocated to each cell, so that a pattern comprising a limited number of cells is projected onto a hologram area far away from it upon Fourier transform. As is the case with the pattern recording area, the hologram area, too, is divided into a matrix array of cells to record amplitude information and phase information at each cell site where the pattern to be recorded is subjected to Fourier transform.

In the Fourier transform computer-generated hologram with such pre-selected patterns recorded therein, a pattern in a form depending on direction is viewed upon reconstruction. For instance, when the two sides of the hologram are reversed to reverse the left and right sides while the top and bottom remain intact, a mirror image is viewed, in which a right-hand image is seen as a left-hand image. When the top and bottom and the left and right sides of the hologram are reversed while the two sides remain intact, on the other hand, an inverted image is seen, in which an erect image is seen as an inverted image.

Accordingly, unless, upon transmission holograms 2 and 3 comprising such computer-generated holograms mounted on a spectacle frame 1, their top and bottom and their two sides are in proper alignment with the spectacle frame 1, then the viewer could not properly see the pre-selected pattern in a given form.

SUMMARY OF THE INVENTION

In view of such problems with the prior art, the object of the present invention is to provide a viewing device such as holographic spectacles, which enables a given pattern to be properly viewed in place of light sources in a scene and is easy to fabricate and assemble with consistent characteristics, and a computer-generated hologram for the same.

According to the present invention, the above object is achieved by the provision of a holographic viewing device in which a computer-generated hologram constructed as a transmission Fourier transform hologram is fitted in a frame member, wherein at least one of phase information and amplitude information recorded in a certain predetermined peripheral site of the computer-generated hologram relative to an input pattern reconstructible from the computer-generated hologram is removed.

Preferably in the present invention, the computer-generated hologram comprises a phase hologram, and the phase information recorded in a certain predetermined peripheral site of the computer-generated hologram relative to an input pattern reconstructible from the computer-generated hologram is removed.

Preferably in the present invention, the computer-generated hologram has a phase distribution multivalued to four or more levels.

Preferably in the present invention, the computer-generated hologram is in a rectangular matrix form in which a number of minuscule computer-generated hologram elements having identical characteristics are set together in parallel, and a minuscule computer-generated hologram element is removed from any one of pre-determined four corners of the computer-generated hologram.

Preferably in the present invention, the input image patterns recorded in computer-generated holograms fitted in right and left frames of the viewing device have binocular parallax.

The present invention also provides a computer-generated hologram for a holographic viewing device, which is constructed as a transmission Fourier transform hologram for the holographic viewing device, wherein at least one of phase information and amplitude information recorded in a certain predetermined peripheral site of the computer-generated hologram relative to an input pattern reconstructible from the computer-generated hologram is removed.

Preferably in the present invention, the computer-generated hologram comprises a phase hologram, and the phase information recorded in a certain predetermined peripheral site of the computer-generated hologram relative to an input pattern reconstructible from the computer-generated hologram is removed.

Preferably in the present invention, the phase distribution is multivalued to four or more levels.

Preferably in the present invention, the computer-generated hologram is in a rectangular matrix form in which a number of minuscule computer-generated hologram elements having identical characteristics are set together in parallel, and a minuscule computer-generated hologram element is removed from any one of predetermined four corners of the computer-generated hologram.

Thus, the present invention provides a computer-generated hologram constructed as a transmission Fourier transform hologram is fitted in a frame member, wherein at least one of phase information and amplitude information recorded in a certain predetermined peripheral site of the computer-generated hologram relative to an input pattern reconstructible from the computer-generated hologram is removed. The site from which the information has been removed can be checked at first glance so that whether or not the top and bottom and the two sides of that computer-generated hologram are properly positioned can immediately be made out. This computer-generated hologram can easily be mounted on a frame such as a spectacle frame in a proper form, so that a given input image pattern can easily be seen properly in place of light sources in a scene.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Embodiments of the holographic viewing device of the invention and the computer-generated hologram for the same are now explained.

Figure 1:
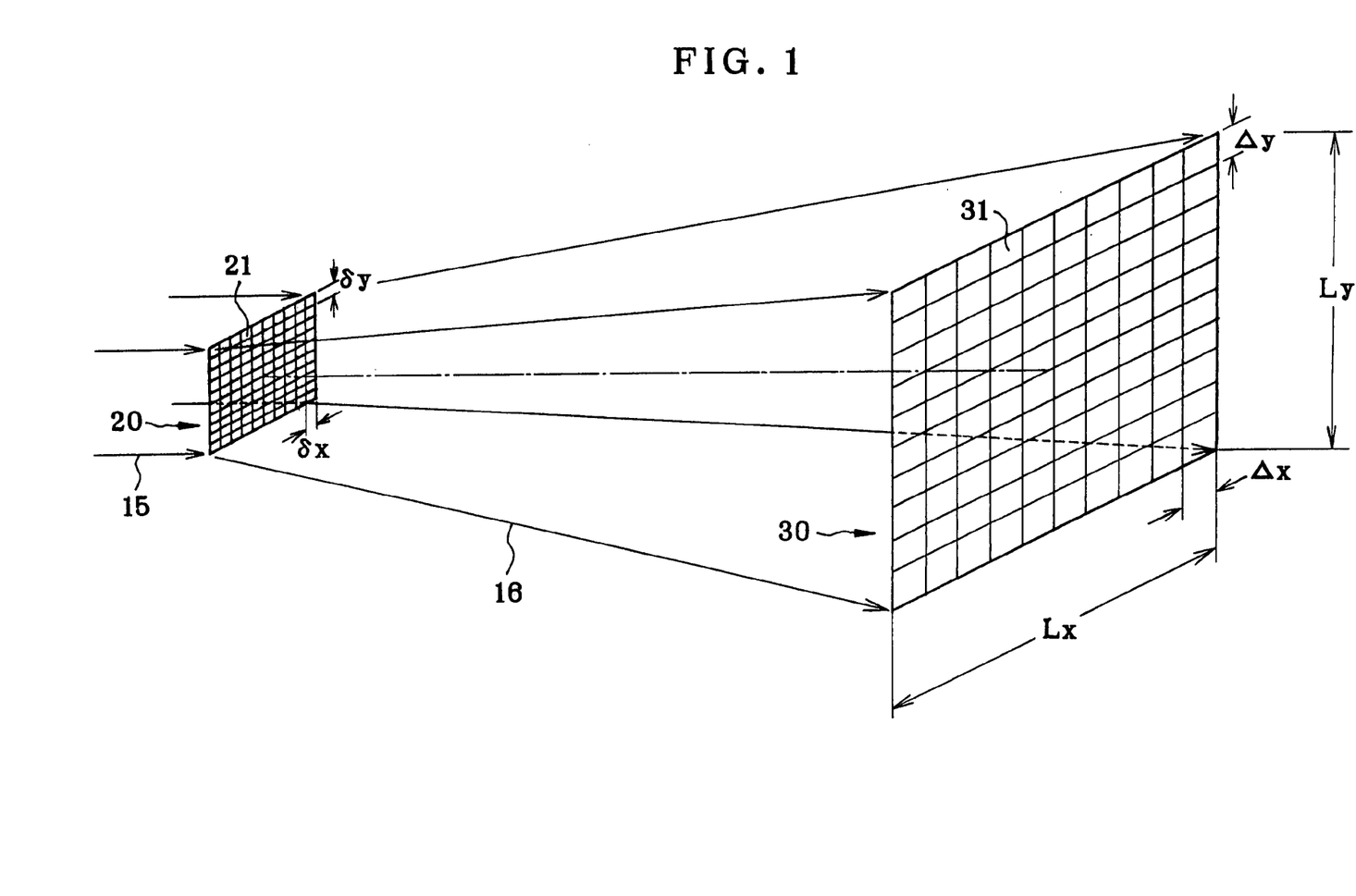
FIG. 1 is illustrative in schematic of a computer-generated hologram mounted on the frame of the holographic spectacles of the invention, and an image area reconstructed from the same.
Figure 8A:
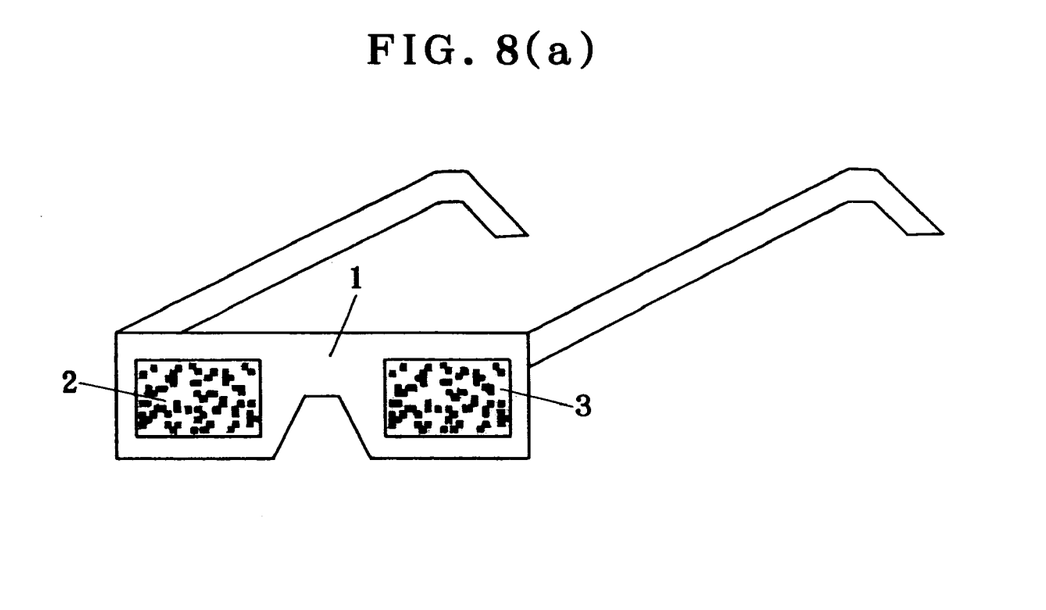
FIGS. 8(a), 8(b) and 8(c) are illustrative of conventional holographic spectacles and how they work.
Figure 8B:
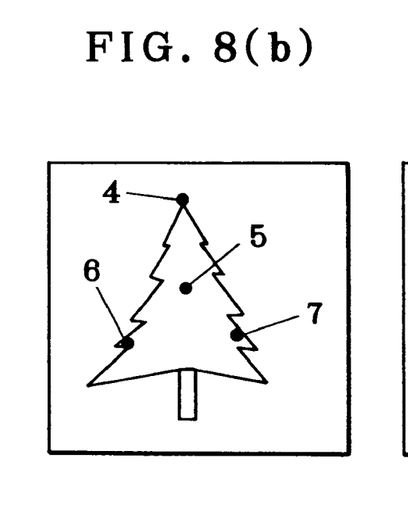
Figure 8C:
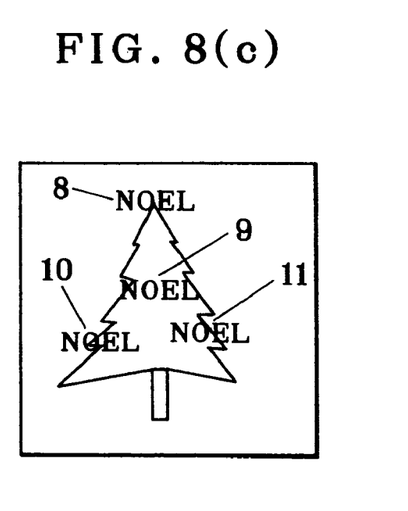

FIG. 1 is illustrative in schematic of a computer-generated hologram 20 (corresponding to the transmission holograms 2, 3 of FIG. 8(a)) to be mounted on the frame of the holographic spectacles of the invention, and an image area 30 reconstructed from the same. The computer-generated hologram 20 is a Fourier transform hologram that comprises an array of minuscule cells 21 arranged in a matrix form with a size $\delta_y$ in the column (y-axis) direction and a size $\delta_x$ in the row (x-axis) direction. In this embodiment, each cell has position information alone, as described later. The matrix array has $2^m$ cells 21 in the x-axis direction and $2^n$ cells 21 in the y-axis direction.

On the other hand, the image area 30 positioned far enough from the computer-generated hologram 20 comprises an array with $2^m \times 2^n$ cells 31 in the x- and y-directions, corresponding to the computer-generated hologram 20. Each cell 31 has a size $\Delta_y$ in the column (y-axis) direction and a size $\Delta_x$ in the row (x-axis) direction, and the image area 30 has a length $L_x$ in the x-axis direction and a length $L_y$ in the y-axis direction.

The lengths $L_x$ and $L_y$ of the image area 30 in the x- and y-axis directions have correlations with the sizes $\delta_x$ and $\delta_y$ of the cell 21 of the computer-generated hologram 20 in the x- and y-axis directions, respectively. In terms of the angle of diffraction from the computer-generated hologram 20 (the image area 30 is positioned far enough from the computer-generated hologram 20, and so the $L_x$ and $L_y$ should preferably be given by angle), $L_x$ corresponds to a range contained in the spreading of the ± first-order diffracted light from a diffraction grating having a spatial frequency of $1/(2\delta_x)$ and $L_y$ corresponds to a range contained in the spreading of the ± first-order diffracted light from a diffraction grating having a spatial frequency of $1/(2\delta_y)$. This correspond to the fact that the maximum spatial frequency recorded in the computer-generated hologram 20 is $1/(2\delta_x)$ in the x-axis direction and $1/(2\delta_y)$ in the y-axis direction.

As, in such positions relations, parallel light 15 having a given wavelength enters the computer-generated hologram 20 from its front, diffracted light 16 occurs on the back surface side of the computer-generated hologram 20, so that a pattern recorded in the computer-generated hologram 20, for instance, such a letter "F" as described later is reconstructed on the image area 30 far away from the hologram 20. Accordingly, when the computer-generated hologram 20 is used instead of spectacle lenses to view a scene from the front, the user would see the letter "F". Thus, when the computer-generated hologram 20 is used to view such a scene as typically shown in FIG. 8(b), the user would see the pattern "F" in place of light sources 4, 5, 6 and 7.

A specific embodiment of how to calculate the phase information of each cell 21 such that the computer-generated hologram 20 reconstructs the pattern "F" is now explained. To impart given diffracted light to a reconstruction image plane, this embodiment relies on a method of calculating a computer-generated hologram to be located on a hologram surface while Fourier transform and inverse Fourier transform are alternately repeated between the reconstruction image plane and the hologram surface with the application of a bound condition. For that method called Gerchberg-Saxton iterative calculation method, for instance, see "Holograms and Diffraction Type Optical Elements—from fundamental theories to industrial applications" used as the text at the 22nd Winter Seminar held by the Optics Society of Japan (the Applied Physics Society of Japan), pp. 36–39.

Figure 2:
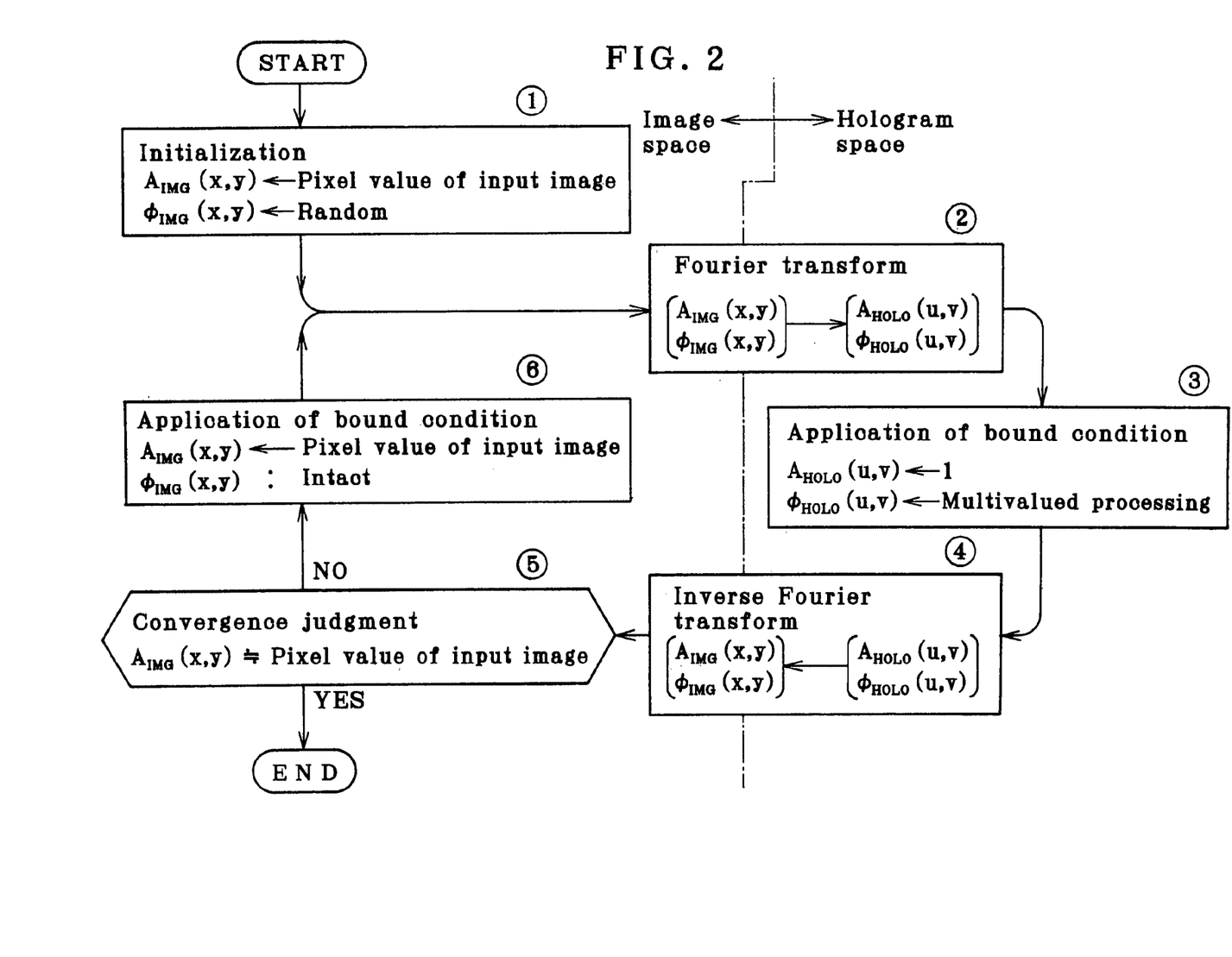
FIG. 2 is a flowchart of the steps for obtaining the computer-generated hologram of the invention.

To help understand the invention, suppose here that $A_{IMG}(x, y)$ is the amplitude distribution (pixel value) of an input image on the reconstruction image plane 30, $\phi_{IMG}(x, y)$ the phase distribution of the input image on the reconstruction image plane 30, $A_{HOLO}(u, v)$ the amplitude distribution of the input image on the hologram surface 20, and $\phi_{HOLO}(u, v)$ the phase distribution of the input image on the hologram surface 20. As shown in FIG. 2, in step (1) the pixel value of the input image to be recorded is given as $A_{IMG}(x, y)$ at the reconstruction image plane 30 area to initialize the phase distribution of the input image to a random value, and in step (2), Fourier transform is performed on the initialized value. In step (3), the amplitude distribution $A_{HOLO}(u, v)$ on the hologram surface 20, obtained by Fourier transform, is assumed to be unity to give a determined bound condition to make a multivalued phase distribution $\phi_{HOLO}(u, v)$ (quantization). After such a bound condition has been imparted, in step (4) inverse Fourier transform is performed on the amplitude distribution $A_{HOLO}(u, v)$ and phase distribution $\phi_{HOLO}(u, v)$ to which that bound condition is given. If, in convergence judgment step (5), the amplitude distribution $A_{IMG}(x, y)$ on the reconstruction image plane 30, obtained through that inverse Fourier transform, is found to be substantially equal to the pixel value of the input image, then the multivalued (quantized)

phase distribution $\phi_{HOLO}(u, v)$ in step (3) becomes the phase distribution given to the cells 21 of the computer-generated hologram 20. If, in convergence judgment step (5), the amplitude distribution $A_{IMG}(x, y)$ obtained through inverse Fourier transform is found to be not equal to the pixel value of the input image, then a bound condition is imparted in step (6) in such a way that the pixel value of the input image is imparted in place of the amplitude distribution $A_{IMG}(x, y)$ while the phase distribution $\phi_{IMG}(x, y)$ obtained through inverse Fourier transform is maintained intact. After such a bound condition has been imparted, a loop of steps (2)→(3)→(4)→(5)→(6) is repeated until the condition for step (5) is satisfied or converged, which results in the final desired computer-generated hologram 20.

It is acceptable to perform the given multivalued processing after the condition for step (5) has been satisfied without performing multivalued processing on the phase distribution $\phi_{HOLO}(u, v)$ in step (3).

The depth distribution of an actual hologram is determined from the thus obtained multivalued phase distribution $\phi_{HOLO}(u, v)$. For such a transmission hologram as used herein, the depth is transformed into the depth $D(x, y)$ of the computer-generated hologram 20 on the basis of the following equation (1).

$$D(u, v) = \lambda \phi_{HOLO}(u, v) / \{2\pi(n_1 - n_0)\} \quad (1)$$

Figure 3:
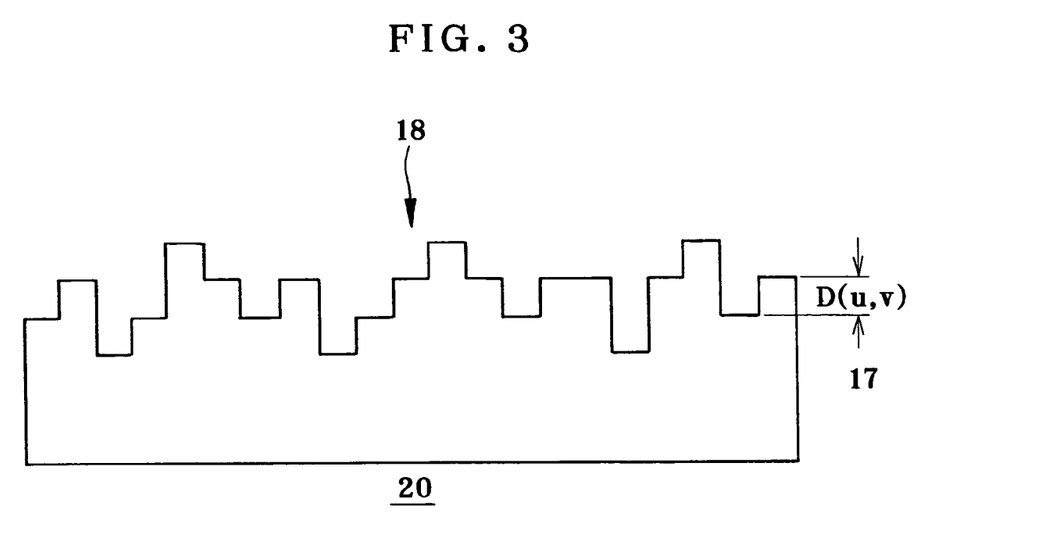
FIG. 3 is illustrative in section of one exemplary construction of the computer-generated hologram of the invention.

Here $\lambda$ is the center wavelength used, and $n_1$ and $n_0$ are the refractive indices of two materials that form the transmission hologram. As shown typically in the sectional view of FIG. 3, a relief pattern 18 having a depth $D(u, v)$ found from equation (1) is formed on the surface of a transparent substrate 17 so that the computer-generated hologram 20 of the invention can be obtained. FIG. 3 is illustrative of a specific example of $\phi_{HOLO}(u, v)$ multivalued to four levels of 0, $\pi/2$, $\pi$ and $3\pi/2$. It is here noted the coordinates $(u, v)$ on the hologram surface 20 are provided to make a difference with the coordinates $(x, y)$ on the reconstruction image plane 30, with the u-axis direction corresponding to the x-axis direction and the v-axis direction to the y-axis direction.

The thus obtained computer-generated hologram 20 requires an enormous amount of calculation. In actual applications, a minuscule hologram element 20 is first fabricated. Then, a number of such hologram elements 20 are tightly arranged parallel in a desired area into transmission holograms 2, 3 that are mounted on a spectacle frame 1.

The reason is that each hologram element 20 is capable of reconstructing the pattern recorded therein in the image area 30 far enough therefrom, and even when the pupil of the user is obstructed by some hologram elements 20, the viewer could perceive them as one single pattern where they overlap, because the pattern of each hologram element 20 is reconstructed at a position far enough therefrom.

Figure 4A:
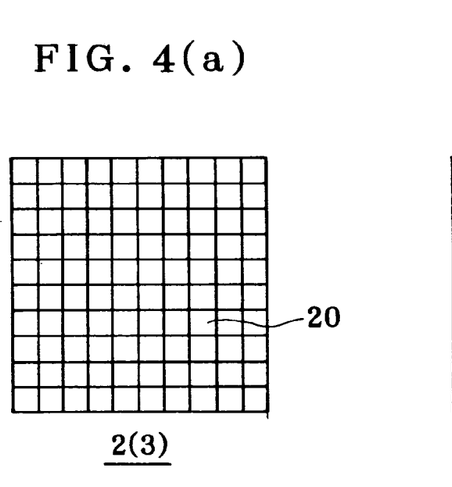
FIGS. 4(a) and 4(b) are illustrative of how a number of minuscule computer-generated hologram elements having the same characteristics as those of the computer-generated hologram used for the holographic spectacles of the invention are set together to construct that computer-generated hologram.
Figure 4B:
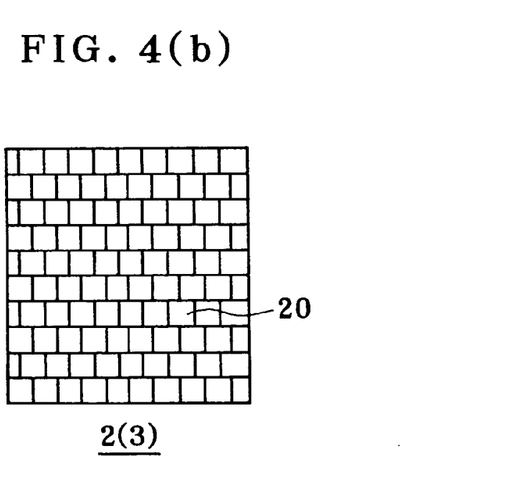

Such minuscule computer-generated holograms (hologram elements) 20 having the same characteristics, each of rectangular shape, could be arrayed in a lattice matrix into the transmission hologram 2, 3, as shown in FIG. 4(a). Alternatively, the hologram elements 20, again each of rectangular shape, could be arranged into the transmission hologram 2, 3 while, as shown in FIG. 4(b), the elements at even-number rows, e.g., the second and fourth rows, are displaced by a half pitch in the row direction. It is noted that the hologram elements 20 are not always limited to square or rectangle, and so they could take on other polygonal forms. To achieve a close array, the hologram elements 20, each of triangular shape, could be arrayed with adjacent elements 20 turned upside down. If the hologram elements 20 are of hexagonal shape, the hologram elements at a certain row could be displaced by a half pitch between the upper row and the lower row, as shown in FIG. 4(b).

As described above, the computer-generated holograms (hologram elements) 20 in the transmission hologram 2, 3 are all the same. To set together such hologram elements 20 as shown in FIG. 4(a) or 4(b) into the transmission hologram 2, 3, it is preferable to rely on a mask for fabricating the transmission hologram 2, 3, wherein photolithographic patterns for the hologram elements 20 are parallel arrayed as shown in FIG. 4(a) or 4(b).

Figure 7:
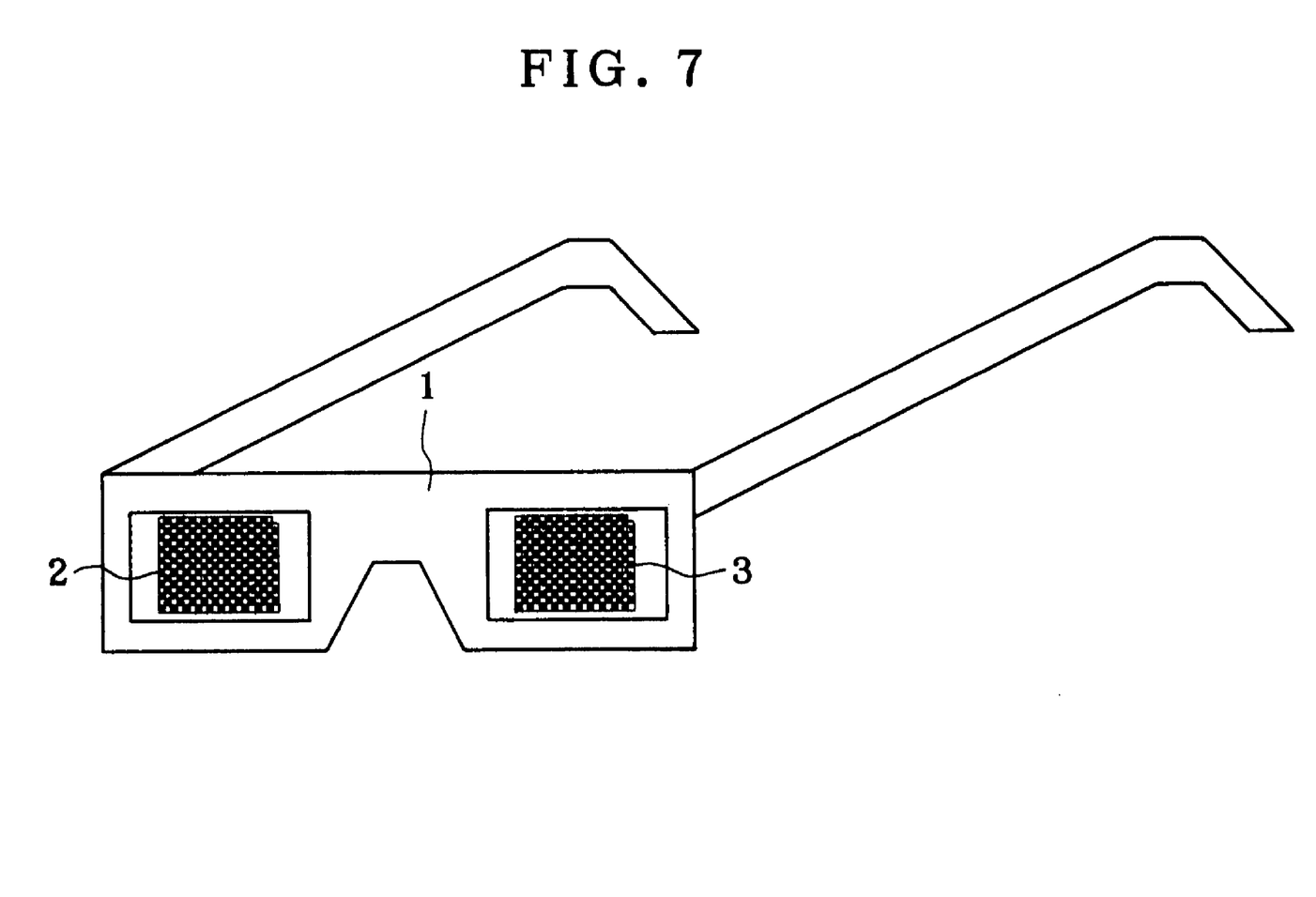
FIG. 7 is a perspective view of the holographic spectacles having the computer-generated hologram fabricated using the photomask of FIG. 6.

The thus fabricated transmission hologram 2, 3 is mounted on a spectacle frame 1 (FIG. 7). Unless, at this time, the holograms 2 and 3 are mounted on the spectacle frame 1 in such a way that their tops and bottoms and two sides are in proper directions with respect to the spectacle frame 1, it is then impossible for the user to have a proper viewing of the pre-selected pattern in a given form. As already described, when the holograms are mounted on the spectacle frame, for instance, with both sides reversed to reverse the right and left sides while the top and bottom remain intact, the user could see a mirror image in place of light sources in the scene; that is, the user could see a right-hand image as a left-hand image. Conversely, when the top and bottom are reversed and the right and left sides are reversed while both sides remain intact, the user could see an inverted image; that is, the user could see an erect image as an inverted image in place of light source in the scene.

In one embodiment of the invention, when a number of identical hologram elements 20 are set together in a lattice matrix into the transmission hologram 2, 3, any one of the hologram elements 20 positioned at four corners is removed to create a mark that help make out the top and bottom and the two sides of the transmission hologram 2, 3 comprising a set of computer-generated hologram elements 20. This embodiment is now explained specifically.

Figure 5A:
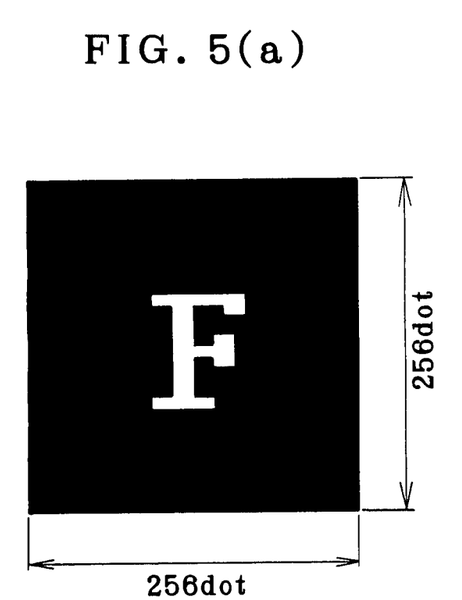
FIGS. 5(a), 5(b) and 5(c) are illustrative of one specific image according to the invention and a basic pattern of photomask for implementing phase modulation corresponding to the image pattern.
Figure 5B:
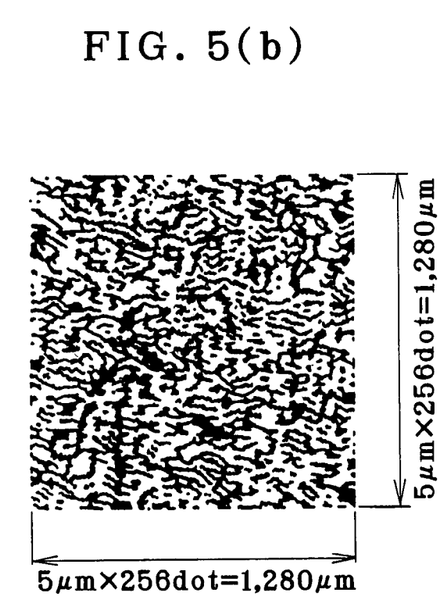
Figure 5C:
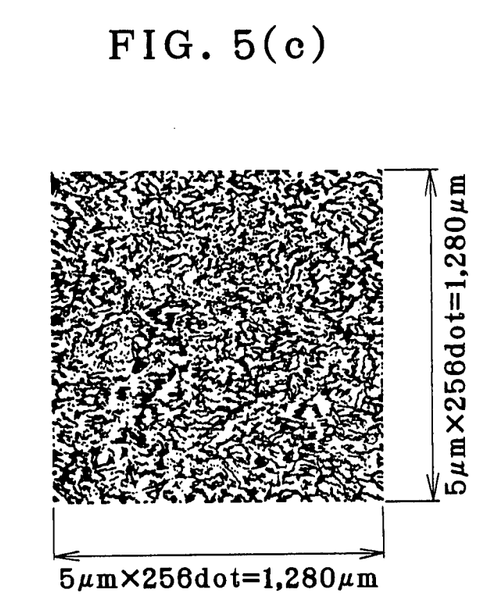

FIG. 5(a) is illustrative of the input image to be recorded in the computer-generated hologram 20 comprising hologram elements. The input image defined by the letter "F" is divided into 256×256 cells, which are then multivalued to the four levels according to the flowchart of FIG. 2, thereby obtaining the computer-generated hologram 20. Basic photomask patterns for implementing phase modulations $\pi$ and $\pi/2$ to the computer-generated hologram 20 are shown in FIGS. 5(b) and 5(c), respectively. As is the case with the input image of FIG. 5(a), each photomask pattern is divided into 256×256 cells, each having a size of 5 $\mu$m×5 $\mu$m, and has a 1.28 mm×1.28 mm size.

Figure 6:
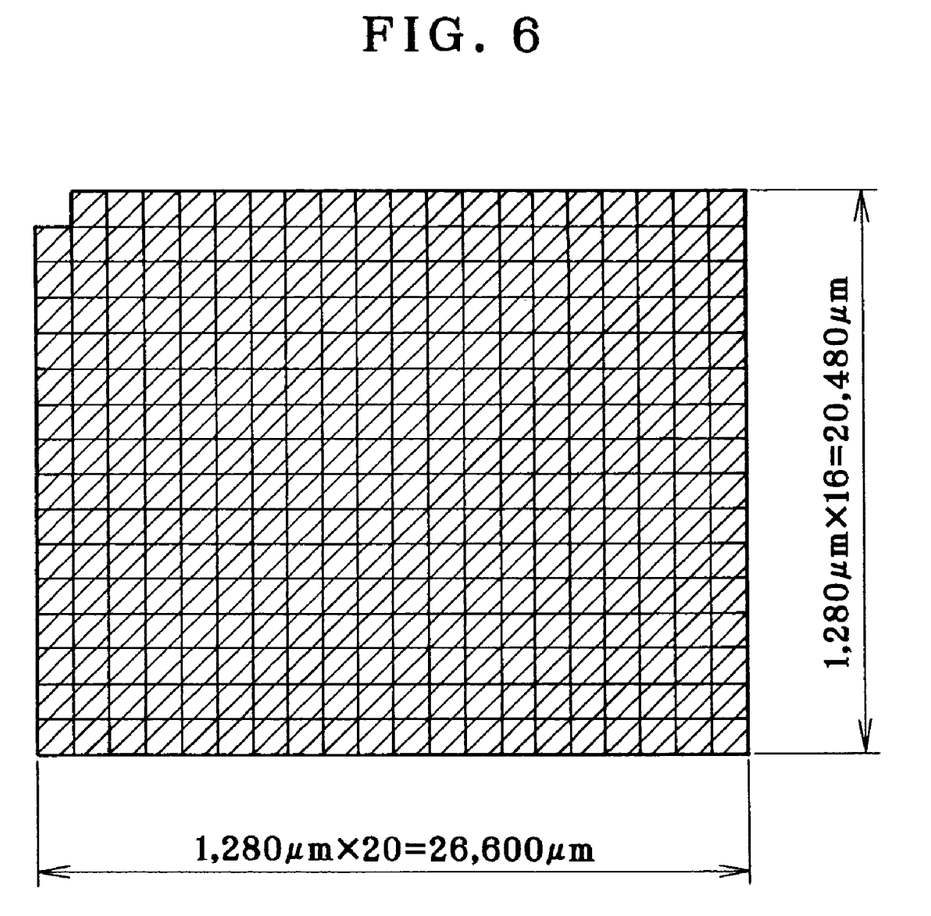
FIG. 6 is illustrative of one exemplary arrangement of the basic pattern of the photomask constructed from the basic pattern of FIG. 5.

Such basic photomask patterns are used to fabricate photomasks for phase modulations $\pi/2$ and $\pi$ by arranging the basic patterns of FIGS. 5(b) and 5(c) in a 16×20 lattice matrix, thereby fabricating the transmission hologram 2, 3 having a 20.48 mm×25.6 mm size. To help make out the top and bottom and the two sides of the transmission hologram 2, 3 in an easy fashion, one hologram element is removed from the left-upper corner of the lattice matrix, as shown in FIG. 6.

Thus, when a number of identical hologram elements 20 are set together in a lattice matrix, the hologram element is removed from any one (the left-upper corner of FIG. 6 as viewed from the viewer side) of the four corners of that matrix, so that the position from which the hologram element is removed can be checked at first glance to know whether or not the top and bottom or the two sides of the transmission hologram 2, 3 are properly located. As shown in the perspective view of FIG. 7, therefore, the transmission hologram 2, 3 can be mounted on the spectacle frame 1 in a proper form.

Reference is now made to how the phase distribution is multivalued to four levels using the photomask comprising the basic pattern for implementing the phase modulation π of FIG. 5(b) and the photomask for implementing the phase modulation π/2 of FIG. 5(c). For instance, when two alignments and etching of a transparent substrate 17 are carried out using a positive resist, alignment operation is performed while an opening in the phase modulation π photomask is superposed on an opening in the phase modulation π photomask thereby obtaining a 3π/2 phase portion; alignment operation is carried out while the opening in the phase modulation π photomask is superposed on a light-shielding portion of the phase modulation π/2 photomask thereby obtaining a π phase portion; alignment operation is performed while a light-shielding portion of the phase modulation π photomask is superposed on the opening in the phase modulation π/2 thereby obtaining a π/2 phase portion; and alignment operation is performed while the shielding portion of the phase modulation π photomask is superposed on the shielding portion of the phase modulation π/2 photomask thereby obtaining a 0 phase portion.

In the foregoing embodiment of the invention, a number of hologram elements having the same characteristics, each comprising the minuscule computer-generated hologram 20, are set together in a rectangular matrix form, thereby obtaining the transmission hologram 2, 3 to be mounted on the spectacle frame 1. In this case, the hologram element 20 is removed from any one of the pre-selected four corners, so that the top and bottom and the two sides of the transmission hologram 2, 3 can be checked. It is understood that when one large computer-generated hologram 20 of rectangular shape is constructed as the transmission hologram 2, 3, the top and bottom or the two side thereof can be checked at first glance by allowing the amplitude or phase information to be drawn to be not recorded in any one of the four corners.

It is here noted that when Fourier transform holograms with patterns of binocular parallax recorded in them are used as the right eye and left eye transmission holograms 2 and 3 to be mounted on the spectacle frame 1, the user could view a pattern in place of the light sources 4, 5, 6 and 7 in such a scene as typically shown in FIG. 8(b) as a 3D image. In such cases, the use of the computer-generated hologram of the invention that is marked in such a way that the top and bottom and the two sides thereof can be checked at first glance helps fabricate and assemble holographic spectacles.

The holographic spectacles of the invention and the computer-generated hologram for the same have been described with reference to some specific embodiments; however, various modifications to them are possible. It is noted that the computer-generated hologram of the present invention is applicable to a holographic monocle as well as to windows and displays. The present invention may also be applied to holograms other than the computer-generated hologram. For instance, to make out the top and bottom and the two sides of other such hologram, it is effective to remove at least one of phase information and amplitude information recorded in a certain predetermined peripheral site of the computer-generated hologram relative to an input pattern reconstructible from that hologram.

As can be appreciated from the foregoing, the present invention provides a holographic viewing device and a computer-generated hologram for the same. Specifically, at least one of phase information and amplitude information recorded in a certain predetermined peripheral site of the computer-generated hologram relative to an input pattern reconstructible from the computer-generated hologram is removed. The site from which the information has been removed can be checked at first glance so that whether or not the top and bottom and the two sides of that computer-generated hologram are properly positioned can immediately be made out. This computer-generated hologram can easily be mounted on a frame such as a spectacle frame in a proper form, so that a given input image pattern can easily be seen properly in place of light sources in a scene.

What we claim is:

1. A holographic viewing device comprising:
   a frame member and
   a computer-generated hologram constructed as a transmission Fourier transform hologram is fitted in a frame member,
   the computer-generated hologram further including:
   a peripheral site being removed in order to fit said hologram in said frame member.

2. The holographic viewing device according to claim 1, wherein the computer-generated hologram comprises a phase hologram.

3. The holographic viewing device according to claim 1, wherein the computer-generated hologram has a phase distribution multivalued to four or more levels.

4. The holographic viewing device according to claim 1, wherein the computer-generated hologram is in a rectangular matrix form in which a number of minuscule computer-generated hologram elements having identical characteristics are set together in parallel, and any one of predetermined four corners of the computer-generated hologram does not contain a hologram element.

5. The holographic viewing device according to any one of claims 1 to 4, wherein input image patterns recorded in computer-generated holograms fitted in right and Left frames of the viewing device have binocular parallax.

6. A computer-generated hologram for a holographic viewing device, which is constructed as a transmission Fourier transform hologram for the holographic viewing device, comprising:
   a frame member and
   a peripheral site being removed in order to fit said hologram in said frame member.

7. The computer-generated hologram according to claim 6, wherein the computer-generated hologram comprises a phase hologram.

8. The computer-generated hologram according to claim 7, wherein a phase distribution is multivalued to four or more levels.

9. The computer-generated hologram according to any one of claims 6 to 8, wherein the computer-generated hologram is in a rectangular matrix form in which a number of minuscule computer-generated hologram elements having identical characteristics are set together in parallel and one of predetermined four corners of the computer-generated hologram does not contain a hologram element.

* * * * *